United States Patent
Cui et al.

(10) Patent No.: US 11,368,451 B2
(45) Date of Patent: Jun. 21, 2022

(54) TWO-FACTOR AUTHENTICATION SYSTEMS AND METHODS

(71) Applicant: Google LLC, Mountain View, CA (US)

(72) Inventors: Yi Cui, Palo Alto, CA (US); Subir Jhanb, Cupertino, CA (US)

(73) Assignee: Google LLC, Mountain View, CA (US)

( * ) Notice: Subject to any disclaimer, the term of this patent is extended or adjusted under 35 U.S.C. 154(b) by 104 days.

(21) Appl. No.: 15/787,812

(22) Filed: Oct. 19, 2017

(65) Prior Publication Data
US 2019/0124063 A1  Apr. 25, 2019

(51) Int. Cl.
G06F 7/04 (2006.01)
H04L 9/40 (2022.01)
G06F 21/34 (2013.01)

(52) U.S. Cl.
CPC ............ H04L 63/083 (2013.01); G06F 21/34 (2013.01); H04L 63/0853 (2013.01); H04L 2463/082 (2013.01)

(58) Field of Classification Search
CPC .............. H04L 63/083; H04L 63/0853; H04L 2463/082; H04L 63/0876; G06F 21/34; G06F 21/12; G06F 21/44; G06F 21/121; G06F 21/31; G06F 21/335; H04W 12/06
USPC .......................................................... 726/7
See application file for complete search history.

(56) References Cited

U.S. PATENT DOCUMENTS

| 7,979,912 B1 | 7/2011 | Roka |
| 9,462,044 B1 | 10/2016 | Preibisch et al. |
| 2005/0049934 A1* | 3/2005 | Nakayama ............. G06Q 30/02 705/500 |
| 2009/0119506 A1* | 5/2009 | Allen ....................... H04L 63/06 380/283 |

(Continued)

FOREIGN PATENT DOCUMENTS

WO  2014026199 A1  2/2014

OTHER PUBLICATIONS

A. Lakshminarayanan et al. Practical Device Association Protocols for Wireless Enabled Personal Devices, IEEE, Mar. 17, 2005, pp. 2484-2489. (Year: 2005).*

(Continued)

Primary Examiner — Luu T Pham
Assistant Examiner — Jenise E Jackson
(74) Attorney, Agent, or Firm — Lerner, David, Littenberg, Krumholz & Mentlik, LLP (57) ABSTRACT

A method including: receiving, from an application executing on a computing device and by an authentication process executing on the computing device, data representative of user credentials corresponding to the application, the authentication process being isolated from the application; packaging, by the authentication process, the data representative of user credentials with a device identification assigned to the computing device and an indication that the user credentials correspond to the application, the device identification being hidden from the application; outputting for transmission, by the authentication process and to an (Continued)

authentication server, an authentication request containing the packaged user credentials and device identification; receiving, by the authentication process and from the authentication server, an indication of authentication of the user credentials; and forwarding the received indication from the authentication process to the application.

17 Claims, 6 Drawing Sheets

(56) References Cited

U.S. PATENT DOCUMENTS

| | | | | |
|---|---|---|---|---|
| 2009/0300744 | A1* | 12/2009 | Guo | H04L 63/0823 726/7 |
| 2012/0066767 | A1* | 3/2012 | Vimpari | G06Q 30/016 726/26 |
| 2013/0104219 | A1* | 4/2013 | Kumar | H04L 9/321 726/9 |
| 2013/0167208 | A1 | 6/2013 | Shi | |
| 2013/0212653 | A1 | 8/2013 | Hoghaug | |
| 2015/0113113 | A1* | 4/2015 | Yang | H04W 4/70 709/223 |
| 2017/0024733 | A1* | 1/2017 | Purves | G06Q 20/20 |
| 2017/0257363 | A1* | 9/2017 | Franke | H04L 63/0853 |
| 2018/0019878 | A1* | 1/2018 | Jiang | H04L 63/0823 |
| 2018/0255054 | A1* | 9/2018 | Oberheide | H04L 63/0853 |
| 2018/0337920 | A1* | 11/2018 | Stites | H04L 63/0815 |
| 2020/0245150 | A1* | 7/2020 | Zhao | H04W 12/40 |

OTHER PUBLICATIONS

Ghallab et al. CMOS Based Lab-on-a-Chip: Applications Challenges and Future Trends, May 19, 2014, IEEE, pp. 27-47. (Year: 2014).*

International Search Report and Written Opinion dated Sep. 27, 2018 in International (PCT) Application No. PCT/US2018/042319 (13 pages).

International Preliminary Report on Patentability for International Application No. PCT/US2018/042319 dated Apr. 30, 2020. 8 pages.

Office Action for European Patent Application No. 18753282.5 dated Mar. 25, 2021. 5 pages.

* cited by examiner

| DeviceID | ALIAS |
|---|---|
| 20 | 10 |
| 50 | 40 |
| 70 | 10 |

420

| DeviceID | App1UN | App1PW | App2UN | App2PW | App3UN | App3PW |
|---|---|---|---|---|---|---|
| 10 | alpha | first | beta | second | gamma | third |
| 20 | | | | | | |
| 30 | beta | fourth | | | beta | fourth |
| 40 | delta | sixth | delta | fifth | | |
| 50 | | | epsilon | fifth | | |
| 60 | | | | | | |
| 70 | | | zeta | seventh | eta | seventh |
| 80 | | | | | | |
| 90 | | | | | | |

…
TWO-FACTOR AUTHENTICATION SYSTEMS AND METHODS

TECHNICAL FIELD

This present disclosure generally relates to two-factor authentication, and more particularly to systems and methods for providing two-factor authentication as a service.

BACKGROUND

Traditionally, simple username/password combinations have been used as log-in credentials. For a more secure application, two-factor authentication may be used. For example, two-factor authentication often requires "something you know" (e.g., a password) and "something you have" (e.g., a telephone number or an authentication dongle). Two-factor authentication systems can be problematic for application developers, though, because each application developer maintains its own secure databases to store this information and confirm user identities. Additionally, two-factor authentication can be inconvenient for users. For example, users may not want to use their phone number as part of a two-factor authentication because they desire to keep their phone numbers private. Further, phone numbers may not be applicable for certain devices (e.g., tablets), and reliance on a phone number in two-factor authentication may require additional steps such as receiving and inputting confirmation codes. Finally, it can be inconvenient for a user to carry around an additional device merely to aid in completing a two-part authentication.

Accordingly, there is a need for an authentication process that relieves developers of the burden of authentication and credential storage, does not inconvenience users, and is applicable to a wide range of devices and uses.

SUMMARY

According to certain aspects of the present disclosure, there is provided a method including: receiving, from an application executing on a computing device and by an authentication process executing on the computing device, data representative of user credentials corresponding to the application, the authentication process being isolated from the application; packaging, by the authentication process, the data representative of user credentials with a device identification assigned to the computing device and an indication that the user credentials correspond to the application, the device identification being hidden from the application; outputting for transmission, by the authentication process and to an authentication server, an authentication request containing the packaged user credentials and device identification; receiving, by the authentication process and from the authentication server, an indication of authentication of the user credentials; and forwarding the received indication from the authentication process to the application.

The device identification may be used for message routing between the authentication server and the computing device; and the user credentials comprise a username and password, and the password is not communicated to an application server corresponding to the application.

The method may further include: receiving, by an authentication process executing on a computing device, data representative of user credentials corresponding to an application; packaging, by the authentication process, the data representative of user credentials with a device identification assigned to the computing device; outputting for transmission, by the authentication process and to an authentication server, an authentication request containing the packaged user credentials and device identification; and receiving, by the authentication process and from the authentication server, and in response to the authentication request, an indication of authentication of the user credentials.

The device identification may be hidden from the application.

The method may further include forwarding the indication from the authentication process to the application.

The method may further include outputting for transmission, by the authentication process and to an application server associated with the application, the indication.

The packaging may include packaging the user credentials with the device identification and an indication that the user credentials correspond to the application.

The authentication server may store the user credentials in a table with the device identification serving as a key to an entry in the table.

The device identification may be used for message routing between the authentication server and the computing device.

The user credentials may include a username and password, and the password is not communicated to an application server corresponding to the application.

The method may further include maintaining a persistent secured connection between the computing device and the authentication server. The user device may transmit the authentication request to and receives the indication of authentication of the user credentials from the authentication server over the persistent secured connection.

The receiving data representative of user credentials may include receiving the data from the application.

The authentication process may be isolated from the application.

The method may further include: in response to the indication of authentication of the user credentials indicating that no user credentials are associated with the device identification, outputting for display an indication that no user credentials are associated with the computing device; receiving a user indication to associate the computing device with another computing device; outputting for transmission, by the authentication process and to the authentication server after the device identification assigned to the computing device is associated with a device identification assigned to the another computing device, a new authentication request containing the user credentials packaged with the device identification of the computing device; receiving, by the authentication process and from the authentication server, and in response to the new authentication request, a new indication of authentication of the user credentials; and forwarding the new indication from the authentication process to the application.

The indication received in response to the authentication request may be not forwarded to the application.

According to certain aspects of the present disclosure, there is provided a nontransitory computer readable medium having stored thereon computer program code that, when executed by a processor on a computing device, instructs the processor to implement an authentication process including: receiving, from an application executing on the computing device, data representative of user credentials corresponding to the application, the authentication process being isolated from the application; packaging the data representative of user credentials with a device identification assigned to the computing device; outputting for transmission, to an authentication server, an authentication request containing the packaged user credentials and device identification; and receiving, from the authentication server, an indication of authentication of the user credentials.

The device identification may be hidden from the application.

The authentication process may further include communicating the indication from the authentication process to the application.

The authentication process may further include outputting for transmission, to an application server corresponding to the application, the indication.

The device identification may be used for message routing between the authentication server and the computing device.

The authentication process may be isolated from the application.

BRIEF DESCRIPTION OF THE FIGURES

Reference will now be made to the accompanying figures, which are not necessarily drawn to scale, and wherein.

DETAILED DESCRIPTION

The present disclosure can be understood more readily by reference to the following detailed description of exemplary embodiments and the examples included herein. It is to be understood that embodiments are not limited to those described within this disclosure. Numerous modifications and variations therein will be apparent to those skilled in the art and remain within the scope of the disclosure. It is also to be understood that the specific terminology used herein is for describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

Certain embodiments of the disclosed technology include systems and methods for providing two-factor authentication service for third-party applications. A centralized repository (or credential store) stores username and password pairs in connection with a unique device identifier (ID) (e.g., at an authentication server of an authentication service). Only the authentication service and the device know the device ID. A third-party application executing on the device receives log-in credentials from a user and forwards those credentials to an authentication process executing on the device. The authentication process combines the log-in credentials with the device ID and securely transmits the combination to the authentication service, which then informs the authentication process as to whether the log-in credentials match the stored credentials associated with that device ID. The authentication process then forwards the response to the third-party application. Accordingly, the third-party application is relieved from the burdens of user authentication, and secure two-factor authentication may be provided without additional burdens on the user.

Figure 1:
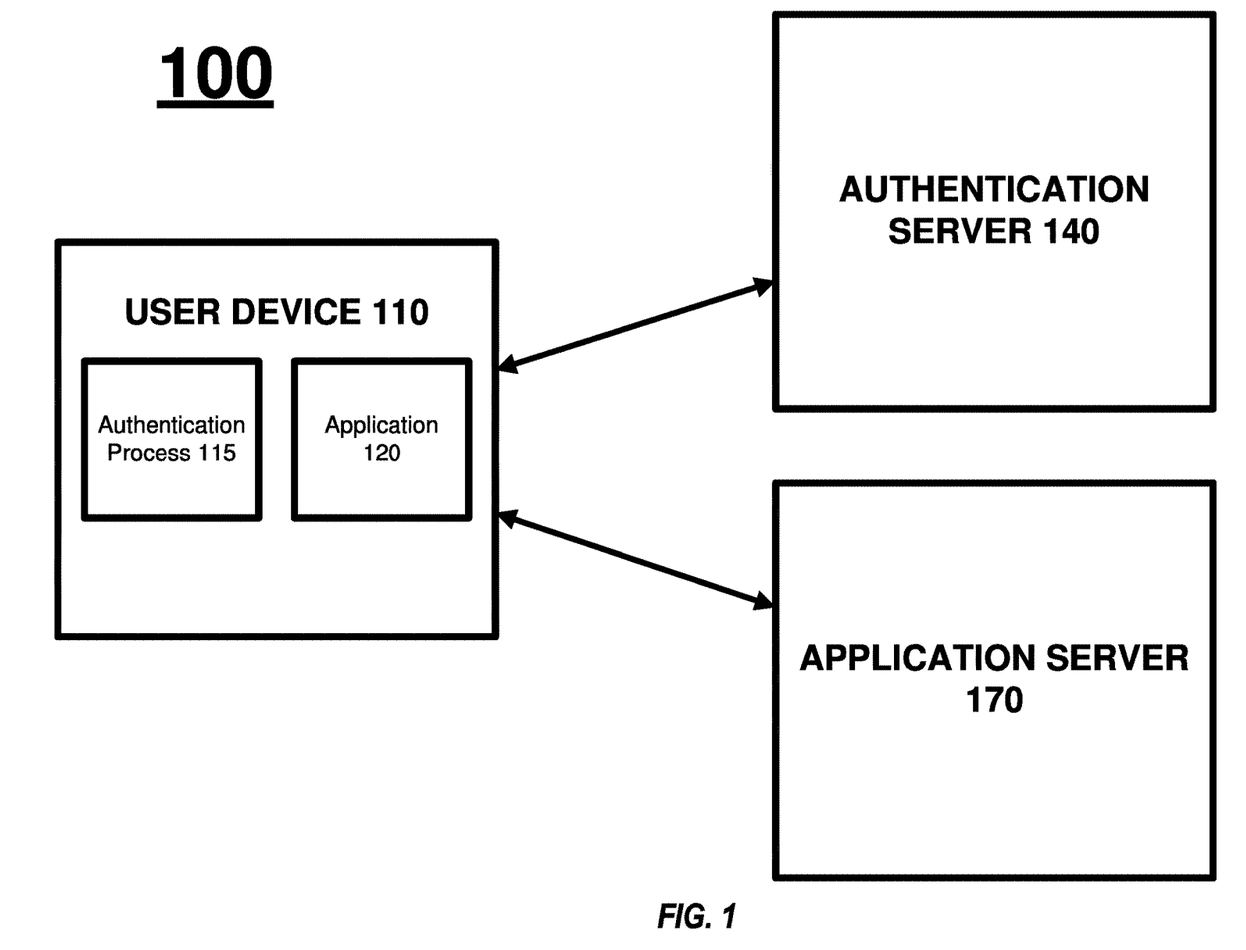
FIG. 1 is an example environment for implementing certain aspects of the present disclosure.

Referring now to the drawings, FIG. 1 is a block-diagram of an environment 100 for implementing certain aspects of the present disclosure. As shown in FIG. 1, in some implementations the environment 100 includes a user device 110, an authentication server 140, and an application server 170. As non-limiting examples, the user device 110 may be a personal computer, a smartphone, a laptop computer, or other personal computing device. The authentications server 140 and the application server 170 may comprise one or more physical or logical devices (e.g., servers). The user device 110 may be configured to communicate with both the authentication server 140 and the application server 170. The user device 110 can run an application 120 corresponding to or associated with the application server 170. The user device 110 may receive log-in credentials (e.g., a username and password) for the application 120. The user device 110 can then combine the log-in credentials with a device identifier (ID) specific to the user device 110, and then send all three (i.e., username, password, and device ID) to the authentication server 140. The log-in credentials may be identified as corresponding to the application 120.

In certain implementations according to the present disclosure, the authentication server 140 stores credentials (e.g., usernames and passwords) for the application 120 in association the device ID. For example, the authentication server 140 may have one or more data tables with columns of credentials for one or more applications and rows keyed to the device ID. The authentication server 140 compares the credentials received from the user device 110 with the stored credentials, and returns a response to the user device 110. The response could be SUCCESS, indicating that the username and passwords are valid for the device ID for the application 120. Additional potential responses are discussed below in greater detail.

The user device 110 may receive the response from the authentication server 140 and forward the received response to the application server 170. If the response is a SUCCESS, the application server 170 may then provide access to user-data, e.g., a user account, to the application 120 executing on the user device 110 (e.g., the user may then use the application 120).

In some embodiments, the user device 110 may not communicate the response out to the application server 170 but may instead communicate the response directly to the application 120 executing on the user device 110. As above, if the response is a SUCCESS, the application 120 may provide access to user-data (e.g., the user may then use the application 120).

In some implementations, the device ID may be a secret known only to the authentication server 140 and the user device 110. Thus, in some cases, the device ID is hidden from the application 120 executing on the user device 110. In such cases, the application 120 may communicate with an authentication process 115 executing on the user device 110. The authentication process 115 may receive the log-in credentials from the application 120 and combine the credentials with the device ID, which can then be communicated to the authentication server 140.

In some cases, the user device 110 may not have an existing device ID, and the authentication server 140 may provide the device ID to the user device 110. The device ID may be a logical entity (e.g., as opposed to a permanent or quasi-permanent designation like International Mobile Equipment Identity (IMEI)). Accordingly, the device ID may be changed throughout the lifetime of the device. For example, the authentications server 140 may provide a new device ID upon factory reset. In some embodiments, user device 110 and the authentication server 140 may communicate using a secured connection, which prevents eavesdropping. In some cases, the authentication process 115 executing on the user device 110 may maintain a persistent secured connection with the authentication server 140. The persistent connection allows for real-time authentication needs of various programs. In some embodiments, user device 110 and the authentication server 140 may communicate using a messaging protocol, and the device ID can be used for routing messages between the authentication server 140 and the user device 110.

In some embodiments, the authentication server 140 may link device IDs that correspond to a plurality of devices used by the same user. For example, if someone uses a smartphone and a laptop, each having their own unique device ID, the respective device IDs may serve as aliases for the smartphone and the laptop. In some cases, a plurality of device IDs may be associated with a single user device 110, and each respective device ID may correspond to respective user accounts associated with the user device 110.

Figure 2:
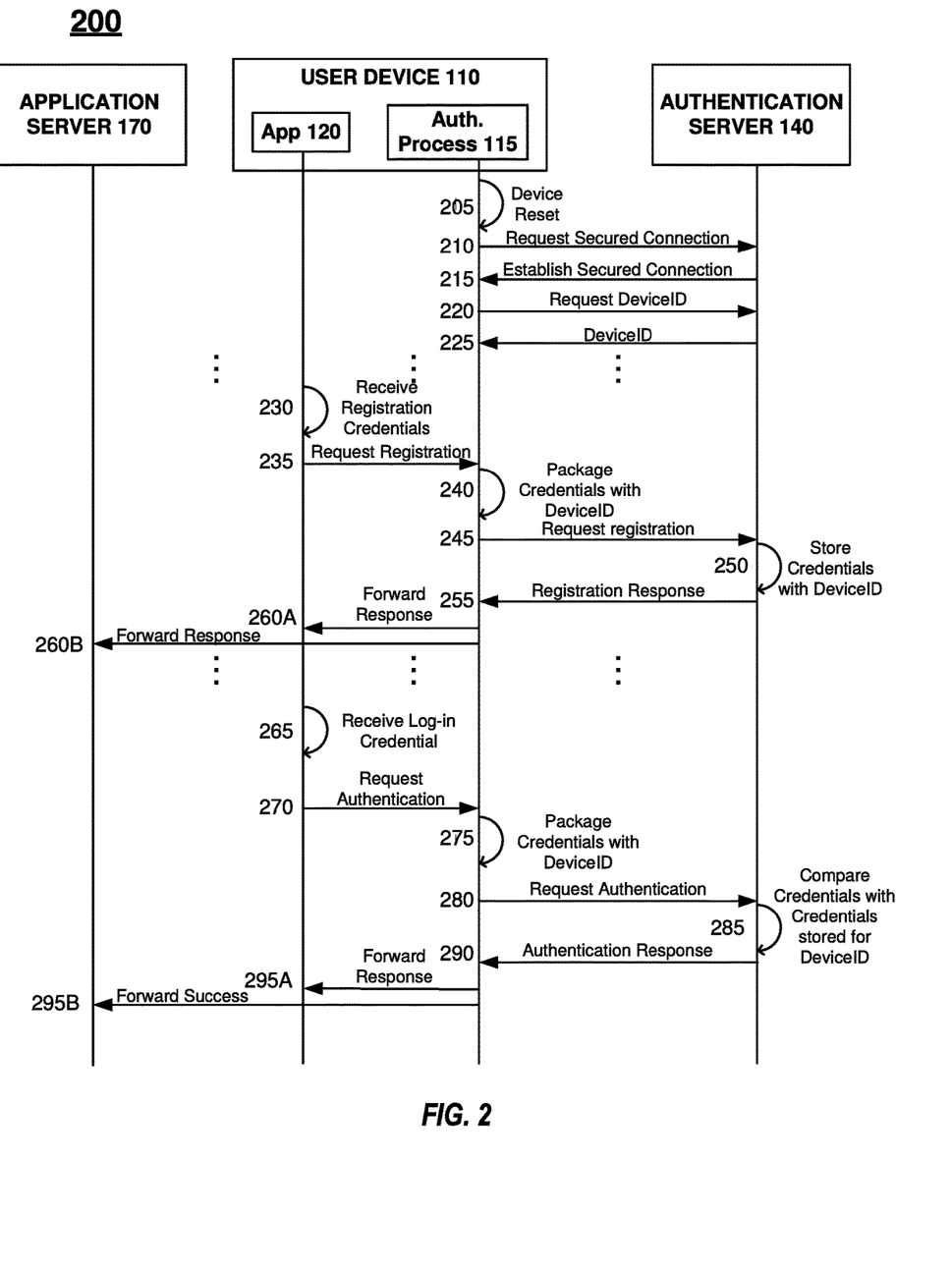
FIG. 2 is a timing diagram of an implementation of certain elements of the present disclosure according to an example embodiment.

Referring now to FIG. 2, there is illustrated a timing diagram 200 of an implementation of certain elements of the present disclosure according to an example embodiment. In the example scenario shown in FIG. 2, the user device 110 is reset 205. The authentication process 115 requests 210 a secured connection with the authentication server 140. The authentication server 140 establishes 215 the secured connection with the authentication process 115. The authentication process 115 requests 220 a device ID from the authentication server 140, and the authentication server provides 225 the device ID to the authentication process 115.

Continuing with the foregoing example, a user of the user device 110 may attempt to register with an application (e.g., application 120). Accordingly, as further shown in the FIG. 2 example, the application 120 receives 230 registration credentials for the user and submits 235 a registration request to the authentication process 115. The authentication process 115 packages 240 the credentials with the device ID (i.e., the device ID received at 225), and submits 245 a registration request to the authentication server 140. For example, the authentication process 115 may package 240 the credentials with the device ID using a particularized data format. The authentication server 140 attempts to store 250 the credentials in relation to the device ID and sends 255 an appropriate registration response to the authentication process 115. For example, as discussed below in greater detail, the authentication server sends 255 a SUCCESS if the authentication server successfully stores 250 the credentials. As further shown in FIG. 2, the authentication process 115 then forwards 260A/260B the registration response to the application 120 or the application server 170, as appropriate.

Again, continuing with the foregoing example, after registering with the application 120, the user attempts to access and use the application. Thus, as shown in the FIG. 2 example, the application 120 receives 265 log-in credentials and submits 270 an authentication request to the authentication process 115. The authentication process packages 275 the credentials with the device ID, and submits 280 the authentication request to the authentication server 140. The authentication server 140 compares 285 the credentials to credentials stored in the authentication server 140 in relation to the device ID. Depending on the result of the comparison, the authentication server 140 sends 290 an authentication response (e.g., SUCCESS or other as applicable) to the authentication process 115. The authentication process 115 then forwards 295A/295B the authentication response to the application 120 or the application server 170, as applicable, and the user can then access the application 120 for use.

One of ordinary skill will understand that the timing diagram shown in FIG. 2 is merely an example, and alternative, fewer, or additional steps may be present in different embodiments. For example, in some cases, the authentication server 140 may provide a device ID to the authentication process 115 without prompting.

In some embodiments, the application server 170 may confirm receipt of the authentication response by communicating directly with the authentication server 140. For example, the response may be time stamped, and an application server 170 may confirm a response for a certain username at a certain timestamp with the authentication server 140. In some implementations, the authentication server 140 may communicate the response directly to the application server 170, bypassing the user device 110 altogether.

In some implementations, the authentication process 115 may react to function calls from the application 120. As non-limiting examples, the authentication process 115 may respond to function calls such as register, newpassword (i.e., a function call for a new or updated password), and authenticate (i.e., a function call to authenticate credentials). In certain implementations, function calls may be provided as an application programming interface (API) associated with the authentication process 115, and the application 120 may make these function calls to the authentication process 115. In the example of a register call, the application 120 may provide registration credentials (e.g., username and password) for the application 120 to the authentication process 115. As discussed above, the authentication process 115 may package these registration credentials with the device ID and transmit the package to the authentication server 140. Depending on the outcome of a comparison between the received package and the stored credentials, the authentication server 140 may provide various responses. For example, SUCCESS: the credentials are successfully registered, ALREADY_REGISTERED: the credentials are already registered in association with the device ID, FAILURE: the credentials were unable to be registered (e.g., if a desired username already exists for the application), or other response as appropriate. The authentication process 115 may then forward the received response to the application 110 or directly to the application server 170.

In the example of a newpassword call, the application 120 may provide the authentication process 115 new credentials (e.g., the username and a new password) for the application 120 when a user creates a new password. In some cases, the newpassword call must include the new password in addition to the existing password. The authentication process 115 may package the credentials (i.e., new password, username, and/or existing password) with the device ID and transmit the package to the authentication server 140. The authentication server 140 may respond with SUCCESS: the credentials have been updated, UNREGISTERED: credentials are not currently stored in association with the device ID, MISMATCH: the credentials were not updated because the old password does not match the currently stored password, or FAILURE: the credentials were otherwise unable to be updated. The authentication process 115 may then forward the response from the authentication server 140 to the application 110 or directly to the application server 170.

In the example of an authenticate call, the application 120 may provide the authentication process 115 log-in credentials (e.g., username and password) for the application 120 when a user wants access to their account. As discussed above, the authentication process 115 may package the credentials with the device ID and transmit the package to the authentication server 140. The authentication server 140 compares the credentials with stored credentials associated with the device ID, and may respond with SUCCESS: the credentials are valid for the device ID for the application 120, UNREGISTERED: credentials are not currently stored in association with the device ID, MISMATCH: credentials do not match the stored credentials for the device ID for the application 120, and FAILURE: no comparison could be made for the credentials. The authentication process 115 may then forward the response from the authentication server 140 to the application 110 or directly to the application server 170. One of ordinary skill will recognize that these calls and responses are merely examples, and various changes may be made within the scope of the present disclosure.

Figure 3:
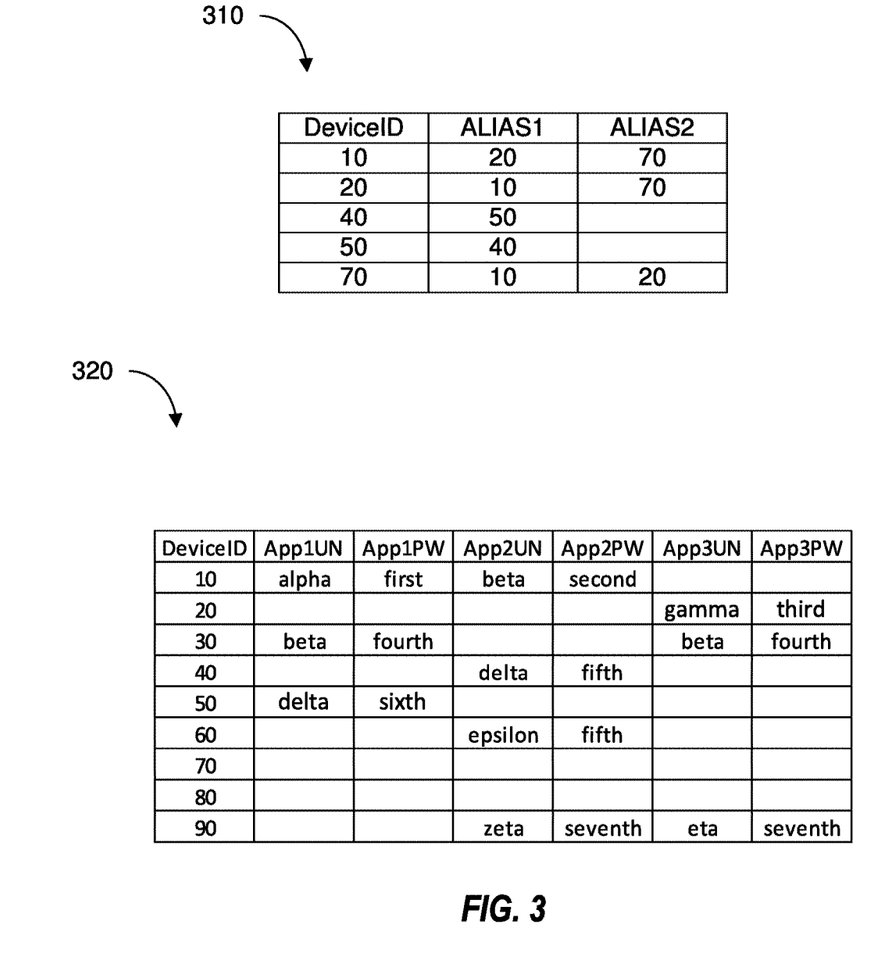
FIGS. 3 and 4 illustrate example credential storage tables according to an example embodiment.

FIG. 3 illustrates example storage tables (i.e., 310, 320) in the authentication server 140 according to an example embodiment. Referring to FIG. 3, the authentication server 140 can store alias table 310 and credentials table 320. Alias table 310 indicates device IDs that are known aliases (e.g., a user has multiple devices, so more than one device ID corresponds to that user's account). For example, as shown in FIG. 3, device IDs 10, 20, and 70 are aliases to each other, as is the case for device IDs 40 and 50.

As further shown in FIG. 3, credentials table 320 stores credentials (e.g., username and password combinations) associated with various device IDs. As can be seen, device IDs 10, 30 and 50 have credentials associated with a first second application, device ID 10, 40, 60, and 90 have credentials associated with a second application, device IDs 20, 30, and 90 have credentials associated with a third application, and device IDs 70 and 80 have no credentials associated with the applications. However, alias table 310 shows that certain aliases of device ID 70 (i.e., device IDs 10 and 20) have credentials associated with the first, second, and third applications.

As a non-limiting example, if an authentication server 140 receives a log-in request with credentials for the first application associated with device ID 70, the authentication server 140 would refer to alias table 310 and compare the received credentials to credentials stored for the first application in the row corresponding to device ID 70 as well as the rows corresponding to device ID 10 and device ID 20. As another example, if an authentication server 140 receives a log-in request with credentials for the third application associated with device ID 30, the authentication server 140 would refer to alias table 310, observe that device ID 30 is not listed as having any aliases, and compare the received credentials to credentials stored for the third application in the rows corresponding to device ID 30 only.

Figure 4:
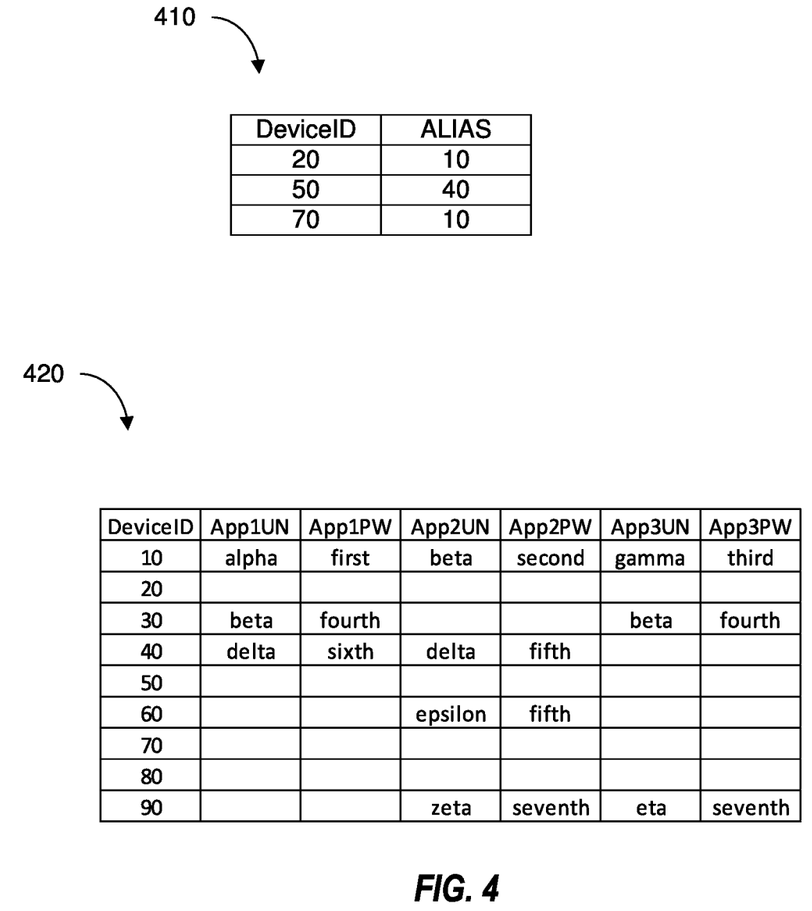

FIG. 4 illustrates additional example storage tables (i.e., 410, 420) in the authentication server 140 according to another example embodiment. Similar to FIG. 3, in FIG. 4, an alias table 410 and a credentials table 420. It will be recognized that credential table 420 of FIG. 4 includes the same credentials as credential table 320 of FIG. 3 but in a different organization. In credentials table 420, the credentials for aliased device IDs are stored in a single row corresponding to a single device ID. For example, the row corresponding to device ID 10 includes credentials for the first through third applications and the row corresponding to device ID 20 is empty. Likewise, the row corresponding to device ID 40 includes credentials for the first and second applications and the row corresponding to device ID 50 is empty. In view of this different organization of credentials table 420, alias table 410 need only includes device IDs that must reference an alias device ID for credentials. Thus, referring to alias table 410, device IDs 20 and 70 refer to device ID 10, and device ID 50 refers to device ID 40.

Using the same examples as above but with reference to storage tables 410 and 420 of FIG. 4, if an authentication server 140 receives a log-in request with credentials for the first application associated with device ID 70, the authentication server 140 would refer to alias table 410 and compare the received credentials to credentials stored for the first application in the row corresponding to device ID 10 only. Meanwhile, if an authentication server 140 receives a log-in request with credentials for the third application associated with device ID 30, the authentication server 140 would refer to alias table 410, observe that device ID 30 is not listed as having any aliases, and compare the received credentials to credentials stored for the third application in the rows corresponding to device ID 30 only.

One of ordinary skill will recognize that alternative formats from the tables illustrated in FIGS. 3 and 4 may be used to store credentials associated with the device IDs. For example, in some cases, multiple users may access one or more applications 120 on a same user device 110. Accordingly, multiple credentials for a same application 120 may be associated with a same device ID.

Figure 5:
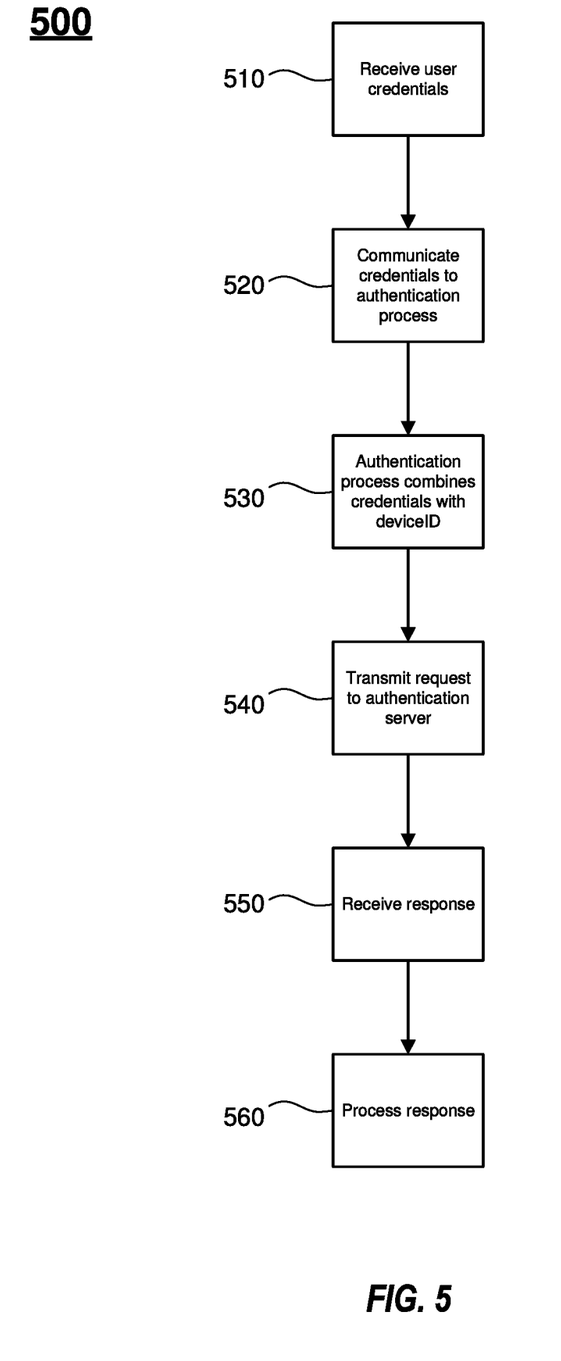
FIG. 5 is a flowchart of a method according to an example embodiment.

FIG. 5 is a flowchart of a method 500 executed by the user device 110 according to an example embodiment. The user device 110 receives 510 user credentials (e.g., username and password). For example, user device 110 may display a log-in screen for application 120 executing on the user device 110, and a user may input the credentials into the log-in screen. As another example, the user device 110 may receive 510 the credentials from an external device. User device 110 may communicate 520 the credentials to authentication process 115 executing on the user device 110. For example, application 120 may perform an authentication call that invoked the authentication process 115 and provides authentication process 115 with the credentials.

As shown in the FIG. 5 embodiment, the authentication process 115 combines 530 the credentials with a device ID of the user device 110, and the user device 110 transmits 540 a request (e.g., an authentication request) to authentications server 140. User device 110 receives 550 a response from the authentication server 140, and processes 560 the response. In some cases, the authentication process 115 may receive 550 the response and process 560 the response by communicating the response to the application 120 as a return for the authentication call. Alternatively, the response may bypass the authentication process 115 and be communicated to the application 120. In some embodiments, user device 110 may then communicate the response to application server 170 and access user data associated with the username.

In some cases, the user device 110 may process 560 the response based on a type of response and/or a type of request. For example, if the response is a SUCCESS, MISMATCH, or ALREADY_REGISTERED, the response may be communicated to the application 120 or to the application server 170 as discussed above. Meanwhile, if the response is a FAILURE, the response may be communicated to the application 120 or to the application server 170, and, additionally, the user device 110 may output a notification that the authentication server 140 is not currently accessible.

However, if the response is UNREGISTERED, the processing 560 may include the user device 110 outputting a prompt indicating that no account is associated with user device 110 for application 120. The prompt may provide a user interface or otherwise guide the user in associating the device ID of user device 110 with an existing device ID (e.g., set device ID of user device 110 as an alias of a device ID of another user device 110). For example, the prompt may ask if the user has registered with the application on another user device 110, and, if so, facilitate aliasing with the device ID of another user device 110 using traditional two-factor authentication of a trusted account associated with the authentication server 140. Once the device ID of the user device 110 is established as an alias of the device ID of the another user device 110, the authentication server 140 may again attempt to process the credentials associated with the device ID, and the user device 110 may receive 550 a new response from the authentication server 140. The new response may be received after a new request is transmitted 540 to the authentications server 140. In some cases, the new response may then be communicated to the application 120 or the application server 170 without communicating the original UNREGISTERED response.

In certain embodiments, the application server 170 never receives or knows the password or the device ID. In some embodiments, however, the authentication process 115 may communicate the response to authentication server 170 directly. In some embodiments, the user device 110 maintains a persistent secured connection with authentication server 140, and communicates with the authentication server 140 over the maintained channel.

Figure 6:
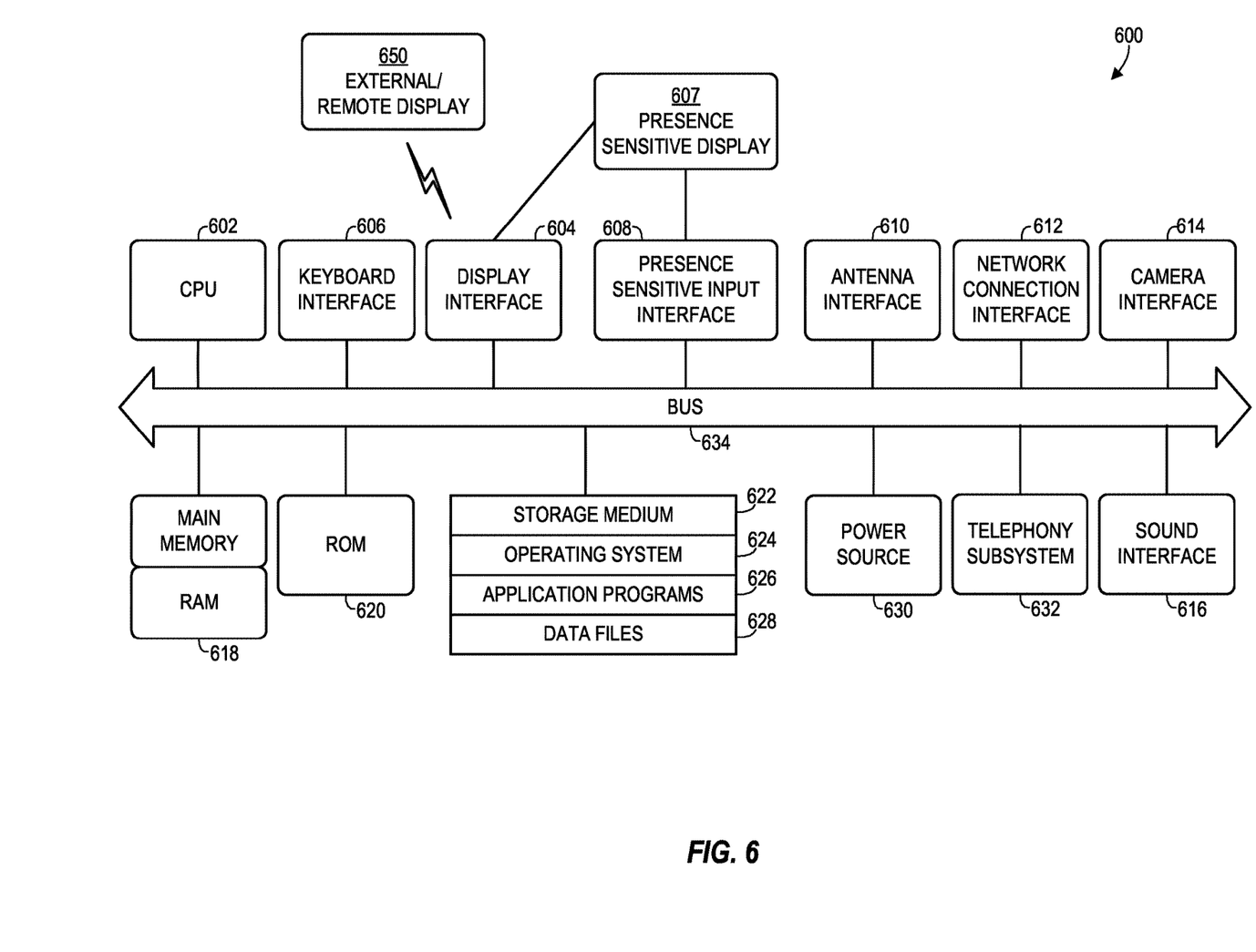
FIG. 6 is a block diagram of an example computer system capable of implementing certain aspects of the present disclosure.

FIG. 6 is a block diagram of an illustrative computing device architecture 600, according to an example implementation. The computing device architecture 600 may be used to implement one or more of a user device 110, authentication server 140, and applications server 170 according to some example embodiments. It will be understood that the computing device architecture 600 is provided for example purposes only and does not limit the scope of the various implementations of the present disclosure. In some embodiments, the user device 110, authentication server 140, and applications server 170 may have fewer, alternative, or additional components as that illustrated in FIG. 6.

The computing device architecture 600 of FIG. 6 includes a central processing unit (CPU) 602, where computer instructions are processed, and a display interface 604 that acts as a communication interface and provides functions for rendering video, graphics, images, and texts on the display. In certain example implementations of the disclosed technology, the display interface 604 may be directly connected to a local display, such as a touch-screen display associated with a mobile computing device. In another example implementation, the display interface 604 may be configured for providing data, images, and other information for an external/remote display 650 that is not necessarily physically connected to the mobile computing device. For example, a desktop monitor may be used for mirroring graphics and other information that is presented on a mobile computing device. In certain example implementations, the display interface 604 may wirelessly communicate, for example, via a Wi-Fi channel or other available network connection interface 612 to the external/remote display 650.

In an example implementation, the network connection interface 612 may be configured as a communication interface and may provide functions for digital virtual assistant using voice, rendering video, graphics, images, text, other information, or any combination thereof on the display. In one example, a communication interface may include a microphone, camera, serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 604 may be operatively coupled to a local display, such as a touch-screen display associated with a mobile device or voice enabled device. In another example, the display interface 604 may be configured to provide video, graphics, images, text, other information, or any combination thereof for an external/remote display 650 that is not necessarily connected to the mobile computing device. In one example, a desktop monitor may be used for mirroring or extending graphical information that may be presented on a mobile device. In another example, the display interface 604 may wirelessly communicate, for example, via the network connection interface 612 such as a Wi-Fi transceiver to the external/remote display 650.

The computing device architecture 600 may include a keyboard interface 606 that provides a communication interface to a keyboard. In one example implementation, the computing device architecture 600 may include a presence sensitive input interface 608 for connecting to a presence sensitive display 607. According to certain example implementations of the disclosed technology, the presence sensitive input interface 608 may provide a communication interface to various devices such as a pointing device, a touch screen, a depth camera, microphone, etc. which may or may not be associated with a display.

The computing device architecture 600 may be configured to use an input device via one or more of input/output interfaces (for example, the keyboard interface 606, the display interface 604, the presence sensitive input interface 608, network connection interface 612, camera interface 614, sound interface 616, etc.) to allow a user to capture information into the computing device architecture 600. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 600 or may be a separate device. For example, the input device may be an accelerometer, a magnetometer, a digital camera, a microphone, and an optical sensor.

Example implementations of the computing device architecture 600 may include an antenna interface 610 that provides a communication interface to an antenna; a network connection interface 612 that provides a communication interface to a network. As mentioned above, the display interface 604 may be in communication with the network connection interface 612, for example, to provide information for display on a remote display that is not directly connected or attached to the system. In certain implementations, camera interface 614 acts as a communication interface and provides functions for capturing digital images from a camera. In certain implementations, a sound interface 616 is provided as a communication interface for converting sound into electrical signals using a microphone and for converting electrical signals into sound using a speaker. In certain implementations, a sound interface 616 is utilized to capture voice inputs for consumption by of other components connected to the BUS 634. According to example implementations, a random-access memory (RAM) 618 is provided, where computer instructions and data may be stored in a volatile memory device for processing by the CPU 602.

According to an example implementation, the computing device architecture 600 includes a read-only memory (ROM) 620 where invariant low-level system code or data for basic system functions such as basic input and output (I/O), startup, or reception of keystrokes from a keyboard are stored in a non-volatile memory device. According to an example implementation, the computing device architecture 600 includes a storage medium 622 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 624, application programs 626 (including, for example, a web browser application, a widget or gadget engine, and or other applications, as necessary) and data files 628 are stored. According to an example implementation, the computing device architecture 600 includes a power source 630 that provides an appropriate alternating current (AC) or direct current (DC) to power components.

According to an example implementation, the computing device architecture 600 includes a telephony subsystem 632 that allows the computing device to transmit and receive sound over a telephone network. The constituent devices and the CPU 602 communicate with each other over a bus 634.

According to an example implementation, the CPU 602 has appropriate structure to be a computer processor. In one arrangement, the CPU 602 may include more than one processing unit. The RAM 618 interfaces with the computer BUS 634 to provide quick RAM storage to the CPU 602 during the execution of software programs such as the operating system application programs, and device drivers. More specifically, the CPU 602 loads computer-executable process steps from the storage medium 622 or other media into a field of the RAM 618 to execute software programs. Data may be stored in the RAM 618, where the data may be accessed by the computer CPU 602 during execution.

The storage medium 622 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 622, which may include a machine-readable storage medium.

According to one example implementation, the term computing device, as used herein, may be a CPU, or conceptualized as a CPU (for example, the CPU 602 of FIG. 6). In this example implementation, the computing device (CPU) may be coupled, connected, and/or in communication with one or more peripheral devices, such as display. In another example implementation, the term computing device, as used herein, may refer to a mobile computing device such as a smart phone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

In the present description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing example embodiments, certain terminology is used for the sake of clarity. It is intended that each term contemplates its broadest meaning as understood by those skilled in the art and includes all technical equivalents that operate in a similar manner to accomplish a similar purpose.

While certain embodiments of the disclosed technology have been described, it is to be understood that the disclosed technology is not to be limited to the disclosed example embodiments, but covers various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and to enable any person skilled in the art to practice the disclosed technology, including making and using any devices or systems and performing any incorporated methods. The patentable scope may include other examples that occur to those skilled in the art. Such other examples are intended to be within the scope of the claims if they have structural elements as the claims, or if they include equivalent structural elements with insubstantial differences from the literal language of the claims.

What is claimed is:

1. A device, comprising:
   memory; and
   one or more processors in communication with the memory, the one or more processors configured to:
   receive, from an application executing on a computing device and by an authentication process executing on the computing device, data representative of user credentials corresponding to the application, the authentication process being isolated from the application;
   package, by the authentication process, the data representative of user credentials with a device identification assigned to the computing device and an indication that the user credentials correspond to the application, wherein packaging comprises packaging the user credentials with the device identification and an indication that the user credentials correspond to the application, the device identification being hidden from the application and only known to the computing device, authentication process, and authentication server;
   output for transmission, by the authentication process and to the authentication server, an authentication request containing the packaged user credentials and device identification;
   receive, by the authentication process and from the authentication server, an indication of authentication of the user credentials, wherein the indication is one of success or failure in authenticating;
   forward the received indication from the authentication process to the application; and
   when the indication is one of failure, output a prompt providing an opportunity to establish the device identification as an alias for a second device identification for a second device; and
   again output for transmission, by the authentication process and to the authentication server, the authentication request containing the packaged user credentials and device identification after the device identification is established as the alias for the second device identification.

2. The device of claim 1, wherein
   the device identification is used for message routing between the authentication server and the computing device; and
   the user credentials comprise a username and password, and the password is not communicated to an application server corresponding to the application.

3. The device of claim 1, wherein an indication of success of authentication includes one of a match or already registered, and wherein an indication of failure of authentication includes one of a mismatch or unregistered.

4. A method comprising:
   receiving, by an authentication process executing on a computing device, data representative of user credentials corresponding to an application, wherein the authentication process is isolated from the application;
   packaging, by the authentication process, the data representative of user credentials with a device identification assigned to the computing device, wherein packaging comprises packaging the user credentials with the device identification and an application indication that the user credentials correspond to the application, wherein the device identification is only known to the computing device, authentication process, and authentication server, and is hidden from the application;
   outputting for transmission, by the authentication process and to an authentication server, an authentication request containing the packaged user credentials and device identification; and
   receiving, by the authentication process and from the authentication server, and in response to the authentication request, an authentication indication of authentication of the user credentials, wherein the indication is one of success or failure in authenticating;
   when the indication is one of failure, outputting a prompt providing an opportunity to establish the device identification as an alias for a second device identification for a second device; and
   again outputting for transmission, by the authentication process and to the authentication server, the authentication request containing the packaged user credentials and device identification after the device identification is established as the alias for the second device identification.

5. The method of claim 4 further comprising forwarding the authentication indication from the authentication process to the application.

6. The method of claim 4 further comprising outputting for transmission, by the authentication process and to an application server associated with the application, the authentication indication.

7. The method of claim 4, wherein the authentication server stores the user credentials in a table with the device identification serving as a key to an entry in the table.

8. The method of claim 4, wherein the device identification is used for message routing between the authentication server and the computing device.

9. The method of claim 4, wherein the user credentials comprise a username and password, and the password is not communicated to an application server corresponding to the application.

10. The method of claim 4, further comprising maintaining a persistent secured connection between the computing device and the authentication server.

wherein the user device transmits the authentication request to and receives the indication of authentication of the user credentials from the authentication server over the persistent secured connection.

11. The method of claim 4, wherein receiving data representative of user credentials comprises receiving the data from the application.

12. The method of claim 4, wherein the authentication process is isolated from the application.

13. The method of claim 4, further comprising:
in response to the indication of authentication of the user credentials indicating that no user credentials are associated with the device identification, outputting for display an indication that no user credentials are associated with the computing device;
receiving a user indication to associate the computing device with another computing device;
outputting for transmission, by the authentication process and to the authentication server after the device identification assigned to the computing device is associated with a device identification assigned to the another computing device, a new authentication request containing the user credentials packaged with the device identification of the computing device;
receiving, by the authentication process and from the authentication server, and in response to the new authentication request, a new indication of authentication of the user credentials; and
forwarding the new indication from the authentication process to the application,
wherein the indication received in response to the authentication request is not forwarded to the application.

14. A non-transitory computer readable medium having stored thereon computer program code that, when executed by a processor on a computing device, instructs the processor to implement an authentication process comprising:
receiving, from an application executing on the computing device, data representative of user credentials corresponding to the application, the authentication process being isolated from the application;
packaging the data representative of user credentials with a device identification assigned to the computing device, wherein packaging comprises packaging the user credentials with the device identification and an application indication that the user credentials correspond to the application wherein the device identification is only known to the computing device, authentication process, and authentication server, and is hidden from the application;
outputting for transmission, to an authentication server, an authentication request containing the packaged user credentials and device identification;
receiving, from the authentication server, an authentication indication of authentication of the user credentials, wherein the indication is one of success or failure in authenticating;
when the indication is one of failure, outputting a prompt providing an opportunity to establish the device identification as an alias for a second device identification for a second device; and
again outputting for transmission, by the authentication process and to the authentication server, the authentication request containing the packaged user credentials and device identification after the device identification is established as the alias for the second device identification.

15. The non-transitory computer readable medium of claim 14, wherein the authentication process further comprises communicating the authentication indication from the authentication process to the application.

16. The non-transitory computer readable medium of claim 14, wherein the authentication process further comprises outputting for transmission, to an application server corresponding to the application, the authentication indication.

17. The non-transitory computer readable medium of claim 14, wherein the device identification is used for message routing between the authentication server and the computing device.

* * * * *